United States Patent

[11] 3,628,353

| [72] | Inventor | Jack W. Armstrong |
| | | Baldwinsville, N.Y. |
| [21] | Appl. No. | 856,031 |
| [22] | Filed | Sept. 8, 1969 |
| [45] | Patented | Dec. 21, 1971 |
| [73] | Assignee | Lipe Rollway Corporation |
| | | Liverpool, N.Y. |

[54] DAMPER ASSEMBLY FOR DRIVE TRAIN
10 Claims, 3 Drawing Figs.

[52] U.S. Cl............................................... 64/27 F,
172/106.1, 74/574, 192/106.2
[51] Int. Cl............................................... F16d 3/14
[50] Field of Search........................................ 64/27;
192/70.17, 106.1, 106.2; 74/574

[56] References Cited
UNITED STATES PATENTS

| 1,719,623 | 7/1929 | Reed | 192/106.1 |
| 3,514,974 | 6/1970 | Adachi | 64/27 R |
| 1,750,827 | 3/1930 | Wemp | 64/27 |
| 3,107,551 | 10/1963 | Cline | 74/574 |

Primary Examiner—Benjamin W. Wyche
Assistant Examiner—Randall Heald
Attorney—Cumpston, Shaw & Stephens ABSTRACT: Driving and driven members of a drive train are arranged as plates astraddle a flange with springs arranged between the plates to engage the flange for resisting angular displacement between the plates and the flange. Elastomeric annuli are compressed between the plates and the faces of the flange with sufficient force to maintain a nonslip engagement with these parts as viscoelastic deformation of the annuli dampens the smaller of the angular displacement. The compressive force on the annuli is insufficient to prevent slipping of the annuli for larger angular displacements to prevent destruction of the annuli.

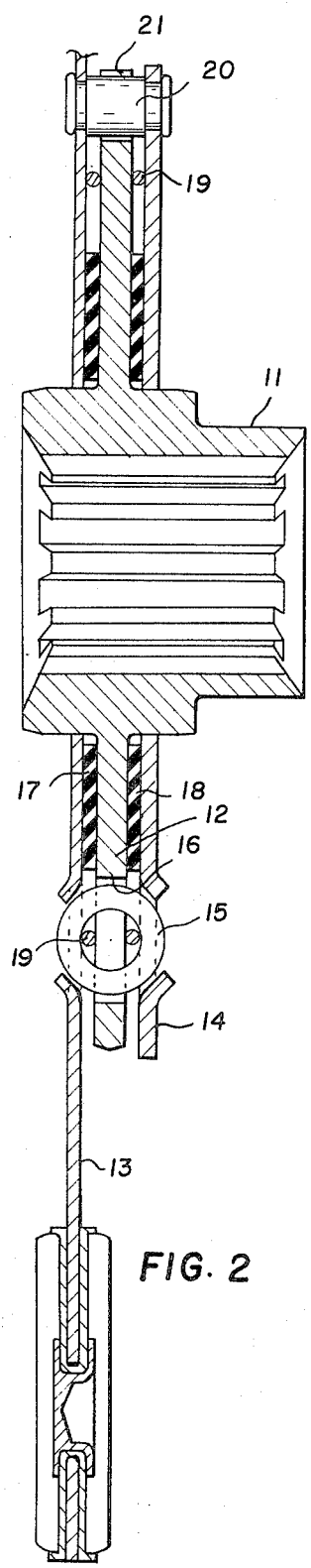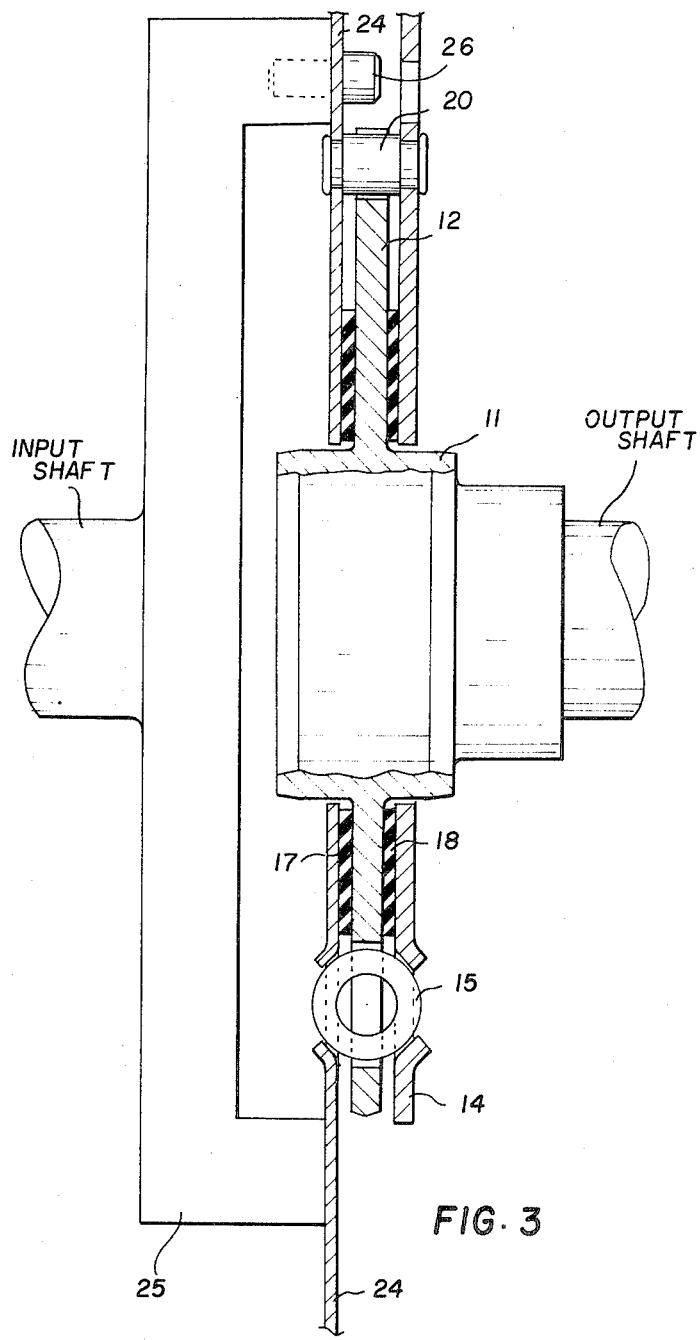

DAMPER ASSEMBLY FOR DRIVE TRAIN

THE INVENTIVE IMPROVEMENT

Clutches and other drive train elements have included spring packs that permit some relative angular displacement between driving and driven members to mitigate the effect of shocks and vibrations of the system. Spring packs do not have an actual dampening effect, however, since they return most of any deformation energy to the system. Spring packs can also develop severe and resonant vibrations that can damage the drive train.

There have been many previous attempts at frictional or viscoelastic dampening in cooperation with such spring packs, but all previous attempts have failed to meet the needs of modern high-speed drive trains. Dampening materials have quickly worn out to lose their dampening effect, have burned up or been destroyed from the heat produced, or have torn loose from their mountings.

The invention aims at a simple and effective way to accomplish viscoelastic damping in combination with such a spring pack, without the viscoelastic medium being burned up, destroyed, or torn apart in the extremely inhospitable environments of modern drive trains. The invention is quite simple in structure and yet its significance has been missed for years in a thoroughly developed art. Months of concentrated effort were exhausted on unworkable solutions before the simple, inventive arrangement was conceived.

SUMMARY OF THE INVENTION

The driving and driven member of a drive train are arranged as a flange extending radially from one of the members, and a pair of spaced-apart plates extending radially from the other member with the plates concentric with the flange and confronting opposite faces of the flange. Springs are arranged between the plates to engage the flange for resisting angular displacement between the plates and the flange. At least one of the plates and the flange have smooth confronting surfaces throughout an annular concentric region, and a flat, smooth, elastomeric annulus is arranged between the confronting surfaces. The plates are secured together to compress the annulus sufficiently to maintain a nonslip engagement with the confronting surfaces as viscoelastic deformation of the annulus dampens the smaller of the angular displacements between the driving and driven member. The compression of the annulus is insufficient to prevent its slipping relative to the confronting surfaces for the larger angular displacements. Preferably a pair of annuli are arranged on each side of the flange between each of the plates.

DRAWINGS

FIG. 2 is a cross section of the view of FIG. 1 taken along the line 2—2 thereof; and FIG. 3 is a cross-sectional view of an alternative embodiment of the inventive damping assembly.

DETAILED DESCRIPTION

Figure 1:
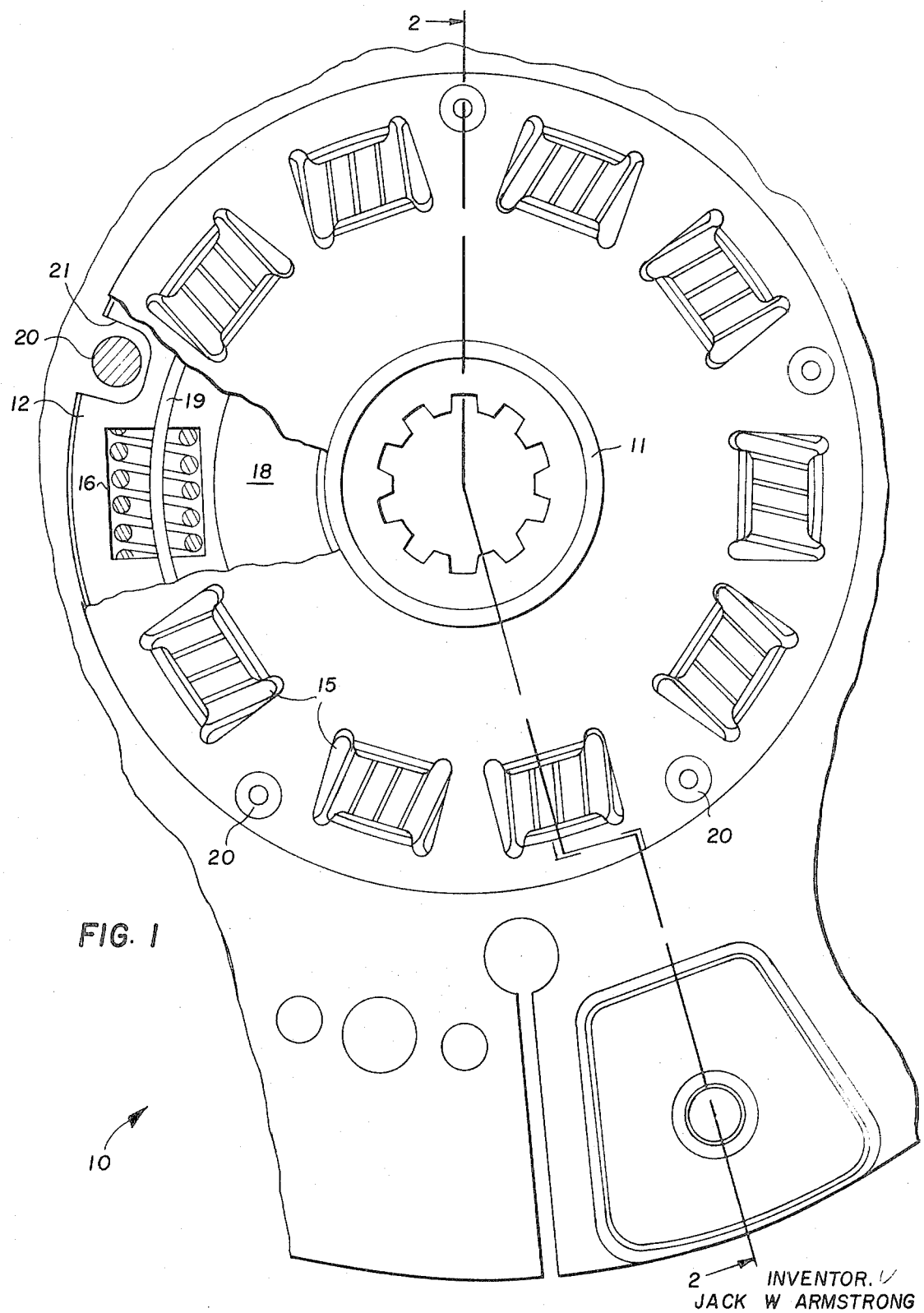
FIG. 1 is a partially cutaway, fragmentary view of a preferred embodiment of the inventive damping assembly.

The assembly 10 shown in FIGS. 1 and 2 is a driven friction disk intended for use in clutches for trucks, automobiles, and the like. It is usable in a variety of other clutches, however, and as shown in FIG. 3, the invention can be used in other drive trains.

Splined hub 11 at the axis of assembly 10 has a radially extending flange 12. Plate 13 of the clutch friction disk is arranged on one side of flange 12, and retainer plate 14 is arranged on the opposite side of flange 12. Plates 13 and 14 are concentric with flange 12 and confront the opposite faces of flange 12. Compression coil springs 15 are retained between plates 13 and 14 to extend through openings 16 in flange 12. Springs 15 thus resist angular displacements between flange 12 and plates 13 and 14. Preferably springs 15 are arranged on a circle radially outwardly from hub 11 and secured by retainer rings 19 extending through springs 15. The faces of plates 13 and 14 confronting flange 12 are preferably smooth throughout an annular concentric region between hub 11 and springs 15. A pair of flat, smooth, elastomeric annuli 17 and 18 are arranged between flange 12 and plates 13 and 14 respectively. Annuli 17 and 18 thus engage the smooth confronting surfaces of plates 13 and 14 and flange 12.

Fasteners 20 secure retainer plate 14 to disk plate 13 to hold the assembly together, and fasteners 20 register with notches 21 formed in the periphery of flange 12. Fasteners 20 and notches 21 limit the angular displacement permitted between flange 12 and disks 13 and 14.

Fasteners 20 also draw plates 13 and 14 together to compress elastomeric annuli 17 and 18. Such compression is sufficient for annuli 17 and 18 to maintain a nonslip engagement with flange 12 and plates 13 and 14 as viscoelastic deformation of annuli 17 and 18 dampens the smaller of the angular displacements between flange 12 and plates 13 and 14. Such small angular displacements and vibrations are absorbed and expended as heat in deforming the elastomeric material of annuli 17 and 18. The compression of annuli 17 and 18 is insufficient to prevent slipping of annuli 17 and 18 relative to flange 12 or plates 13 and 14 for larger angular displacements. Hence, if a relatively large force or shock causes a large displacement between flange 12 and plates 13 and 14, annuli 17 and 18 slip to a new position of engagement with plates 13 and 14 at which they absorb smaller angular displacements through viscoelastic deformation. Another shock or force of large magnitude can make annuli 17 and 18 slip to a new relative position at which they again engage flange 12 and plates 13 and 14 in a nonslip grip to dampen and absorb smaller angular displacements through viscoelastic deformation.

The assembly of FIG. 3 is similar to the assembly to FIGS. 1 and 2, except for input to the driving disk. Driving disk 24 is secured to input drive member 25 by bolts 26 (one of which is shown in FIG. 3). Otherwise, retainer plate 14 secured to driving plate 24 by fasteners 20 to straddle flange 12 of hub 11 to retain springs 15 and to compress annuli 17 and 18 is the same as previously described for FIG. 2.

Elastomeric annuli 17 and 18 are preferably formed of rubber, but many other elastomers are suitable for the work. Annuli can be made in varying thicknesses and to any hardness desired for the particular forces to be dampened. A single annulus can be used on one side of flange 12 or annuli can be stacked as desired and different annuli in the same assembly can have differing damping characteristics. The elastomers annuli can be arranged radially inward or outward of springs 15, and the aluminum or other disks or annuli can be arranged between the elastomeric layers to help conduct away heat generated by the viscoelastic deformation.

The viscoelastic dampening from annuli 17 and 18 absorbs and dampens the small shocks and vibrations otherwise passing between the driving and driven elements, and insures that resonant and damaging vibrations cannot develop. At the same time, the freedom of annuli 17 and 18 to slip between the driving and driven members to yield to the larger shocks and displacements insures that they will not be torn apart or destroyed by such shocks. They merely slip to a new position and continue their dampening effect in engagement with the surfaces of the driving and driven members. Such a solution appears deceptively simple, and yet the art overlooked it for years and failed to achieve its important advantages.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, different shapes and characteristics of elastomeric media can be adapted to specific damping assemblies, and the inventive concepts can be applied by those skilled in the art to a multitude of clutches and other drive train elements.

I claim:

1. In a coupling between a driving and a driven member including a flange extending radially from one of said members, a pair of spaced-apart plates extending the other of said members astraddle said flange, and a plurality of springs arranged between said plates to engage said flange for resisting angular displacement between said flange and said plates, a damper assembly comprising:
   a. at least one of said plates and said flange having smooth, confronting surfaces throughout an annular concentric region;
   b. a flat, smooth, elastomeric annulus arranged between said confronting surfaces with freedom to assume any angular relationship with said confronting surfaces;
   c. said plates being secured together to compress said annulus between said confronting surfaces with sufficient force to hold said annulus in nonslip engagement with said confronting surfaces as viscoelastic deformation of said annulus dampens angular displacements between said flange and said plates; and
   d. said compression of said annulus being insufficient to prevent angular slipping of said annulus to a new angular relationship with said confronting surfaces for occasional angular displacements between said flange and said plates larger than said vibrational displacements.

2. The assembly of claim 1 wherein each of said plates and said flange has smooth, confronting surfaces and one of said annuli is arranged between said confronting surfaces on each side of said flange.

3. The assembly of claim 1 wherein said annulus is formed of rubber.

4. The assembly of claim 1 wherein one of said plates comprises said driving member.

5. The assembly of claim 4 wherein said driving plate comprises the friction disk of a clutch.

6. The assembly of claim 4 wherein said driving plate is secured to an input drive member.

7. The assembly of claim 4 wherein each of said plates and said flange has said smooth, confronting surfaces, and one of said annuli is arranged between said confronting surfaces on each side of said flange.

8. The assembly of claim 7 wherein said annuli are formed of rubber.

9. The assembly of claim 8 wherein said driving plate comprises the friction disk of a clutch.

10. The assembly of claim 8 wherein said driving plate is secured to an input drive member.

* * * * *